March 10, 1970 D. W. HAWK 3,499,236
APRON AND BOWL LIFT MECHANISM
Filed April 12, 1967
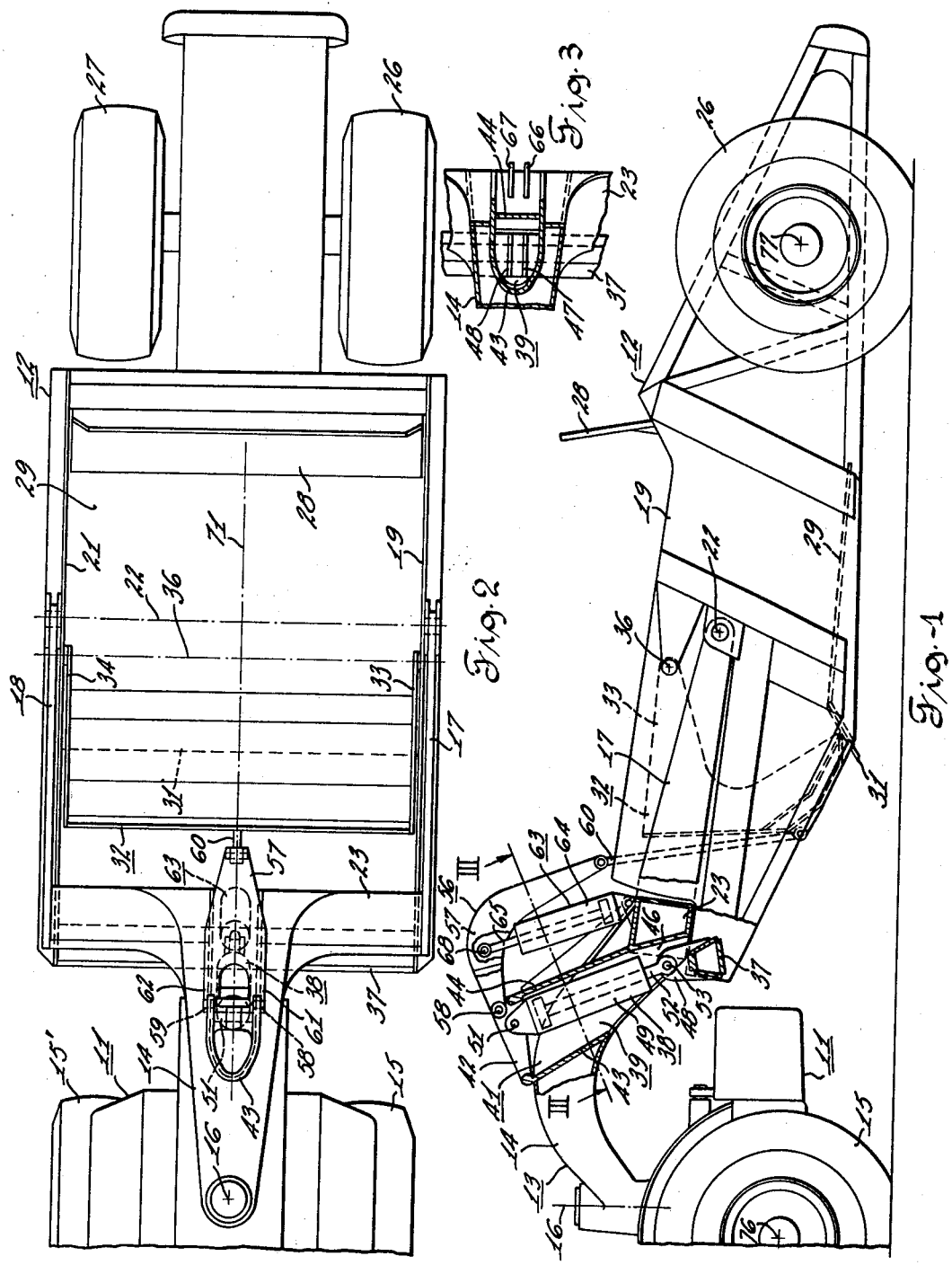
Inventor
Dale W. Hawk
By Chuck E. Schuck
Attorney 3,499,236
APRON AND BOWL LIFT MECHANISM
Dale W. Hawk, Springfield, Ill., assignor to Allis-Chalmers Manufacturing Company, Milwaukee, Wis.
Filed Apr. 12, 1967, Ser. No. 630,372
Int. Cl. E02f 3/62
U.S. Cl. 37—129                                                   5 Claims

ABSTRACT OF THE DISCLOSURE

Herein described is an earthmover having a wheeled scraper bowl connected in draft relation to a wheeled tractor by a draft yoke. An inside arm apron is pivoted to the bowl side walls to provide a swinging door for the front of the scraper bowl and an ejector is provided to eject material from the bowl. A bowl lift mechanism and an apron lift mechanism are mounted on the yoke with hydraulic actuators in alignment on the vertical central plane of the earthmover. The hydraulic actuator for lifting the bowl is ahead of the actuator for raising the apron and is disposed in an open bottom well in the gooseneck portion of the draft yoke.

---

This invention relates to an earthmover of the type having wheeled tractor and bowl units interconnected by a draft yoke and more particularly relates to means for raising and lowering the bowl between transport and excavating positions nad to mechanism for operating the apron for closing off the front of the bowl.

Heretofore, various means have been employed for raising and lowering the wheeled bowl of the motor scraper and for raising and lowering the apron at the forward end of such bowls. However, these prior devices have not proven satisfactory in all respects. One of the objectives of the present invention is to provide for a relatively high mounting of the hydraulic motors used to operate the lift mechanism and apron to minimize exposure to dirt and other excavated material.

Another object of the present invention is the provision of bowl lift and apron operating mechanisms which each employ a single hydraulic motor, so as to minimize the number of hydraulic motors required.

It is a further object of this invention to provide apron and bowl lift mechanisms on the draft yoke of an earthmover which maximizes the payload which may be carried within the wheel spacing between the tractor and bowl units.

These and other objects and advantages of the present invention will be apparent to those familiar with the art when the following description is read in conjunction with the drawings in which:

FIG. 1 shows a side view of an earthmover incorporating the present invention with certain parts shown in section to more clearly illustrate the inventive features;

FIG. 2 is a top view of the earthmover shown in FIG. 1; and

FIG. 3 is a section view taken along the line III—III in FIG. 1.

Referring to the drawings the earthmover in which my invention is incorporated includes a two wheel tractor unit 11, a two wheel bowl unit 12 and a draft yoke 13 which has a longitudinal gooseneck 14 which is pivotally connected at its forward end to the tractor unit 11 for steering movement of the tractor unit about a vertical pivot axis 16. The draft yoke 13 includes a pair of rearwardly extending legs 17, 18, pivotally connected to the side walls 19, 21 of the scraper bowl for pivotal movement about transverse axis 22 between the raised position shown and a lowered excavating position. The legs 17, 18 of the draft yoke 13 are disposed on the outer side of the sidewalls 19, 21 and have their forward ends rigidly secured to a spacer beam 23 which in turn is rigidly secured to the rear end of the gooseneck 14. The bowl unit is provided with a pair of wheels 26, 27, a conventional ejector 28 and has a bottom wall 29 presenting a transverse cutting edge 31 at its forward end. The forward end of the scraper bowl may be opened or closed by operation of an apron 32 which has a pair of rearwardly extending arms 33, 34 pivotally connected to the walls 19, 21, respectively, for pivotal movement about a transverse pivot axis 36.

The forward ends of the bowl side walls 19, 21 are rigidly innerconnected by a tie brace 37 which lies directly below the spacer beam 23 and in the raised position of the bowl has a substantial part lying forward of the spacer beam 23. This forward position of the tie brace facilitates connection with a hydraulic bowl lift motor 38 disposed in a well 39 formed in the gooseneck 14 by walls 41. The walls 41 include a casting 42 welded to the top plates of 43, 44. A recess 46 is provided in the spacer beam 23 to allow space, in the raised position of the bowl, for the lift brackets 47, 48 welded to the tie brace 37. The lift motor 38 includes a pair of extensible and contractible elements in the form of a cylinder 49 pivotally connected at its upper end to the well casting 42 by a pivot pin 51 and a piston element 52 having its rod end pivotally connected to the brackets 47, 48 by a pin 53. Thus it is seen that the motor 38 is positioned relatively high in relation to the material being excavated and thereby is less apt to be subjected to foreign materials which have an adverse effect upon its sealing surfaces.

An apron operating mechanism 56 is disposed rearwardly of the well 39 and in longitudinal alignment therewith. The apron operating mechanism 56 includes a longitudinally disposed lever 57 which has legs 61, 62 at its forward end pivotally connected to the casting 42 of well 39 by pins 58, 59, respectively. The rear end of the lever 57 is pivotally connected to a lift link means in the form of an upstanding rod 60 which in turn has its lower end pivotally connected to the apron 32. The apron lift mechanism 56 also includes a hydraulic motor or jack 63 which has a pair of extensible and contractible components in the form of a cylinder 64 pivotally connected to braces 66, 67 welded to the top side of spacer beam 23 and a piston component 65 having its rod portion pivotally connected by a pin 68 to the lever 57 intermediate its opposite ends.

It will be noted that the motor 38 and jack 63 lie in the vertical longitudinal plane of the vehicle represented by line 71 in FIG. 2. Plane 71 also intersects lever 57. My unique bowl lift and apron operating mechanism permits a single hydraulic jack or motor to be used for each of the bowl and apron operating functions thus minimizing the number of hydraulic actuators that are needed.

Further it will be noted that the spacer beam 23 is relatively low to the ground in spite of the forward position of the tie brace 37, thereby permitting the operator to have a good view of the loading operation of the bowl. The apron operating mechanism and the bowl lift mechanism are in longitudinal alignment so as to minimize the restriction to operator observation of the bowl filling function. The compact arrangement of my bowl lift mechanism and apron operating mechanism permits a maximum bowl size within the spacing between the axis 76 of the front wheels 15, 15′ and the axis 77 of the rear wheels 26, 27.

The embodiments of the invention for which an exclusive property or privilege is claimed are defined as follows:

1. In an earthmover including a wheeled tractor unit and a wheeled bowl unit having raised and lowered positions,
   sidewalls on said bowl,
   a bottom wall on said bowl having a transverse cutting edge at its forward end,
   a transverse tie brace between the forward ends of said side walls substantially forward of said cutting edge,
   an apron pivotally connected to said bowl side walls for movement about a first transverse pivot axis,
   a draft yoke having
   a forwardly extending gooseneck pivotally connected in draft relation to said tractor unit,
   a pair of longitudinally extending legs pivotally secured to said bowl sidewalls, respectively, on a second transverse pivot axis,
   a transverse spacer beam rigidly secured to the rear end of said gooseneck and having opposite ends extending laterally outwardly from said gooseneck and rigidly connected to the front ends of said legs, respectively, said tie brace lying below and at least in part forwardly of said spacer beam in the raised position of said bowl, and
     walls in said yoke defining an open bottom well above said tie brace,
   a hydraulic motor disposed in said well forwardly of said spacer beam having a pair of relatively extensible and contractible elements, one of which is pivotally connected to said yoke and the other of which is pivotally connected directly to said tie brace and
   mechanism mounted on said yoke for pivoting said apron about said first transverse pivot axis.

2. The structure set forth in claim 1 wherein said mechanism is disposed to the rear of said well.

3. The structure set forth in claim 1 wherein said mechanism includes a longitudinally disposed lever having its forward end pivotally connected to said gooseneck, link means connecting the rear end of said lever to said apron and a hydraulic jack rearwardly of said motor having a pair of extensible and contractible components one of which is pivotally connected to said lever and the other of which is pivotally connected to the top side of said spacer beam.

4. The structure set forth in claim 3 wherein the vertical longitudinal plane of the vehicle passes through said motor and jack.

5. The structure set forth in claim 4 wherein the forward end of said lever is pivotally connected to said walls defining said well.

References Cited
UNITED STATES PATENTS

| | | | |
|---|---|---|---|
| 3,014,291 | 12/1961 | Kirchler et al. | 37—129 |
| 3,015,173 | 2/1962 | Kimsey et al. | 37—129 |
| 3,028,694 | 4/1962 | Creighton | 37—129 |
| 3,061,954 | 11/1962 | Johnson | 37—129 |
| 3,073,045 | 1/1963 | Kelley | 37—129 |
| 3,100,945 | 8/1963 | Bernotas | 37—129 |
| 3,118,238 | 1/1964 | Rockwell et al. | 37—129 |
| 3,406,470 | 10/1968 | Fall et al. | 37—129 |

EDGAR S. BURR, Primary Examiner

U.S. Cl. X.R.

37—126